(12) United States Patent
Hirayama et al.

(10) Patent No.: US 7,999,059 B2
(45) Date of Patent: Aug. 16, 2011

(54) OPTICAL FILM AND METHOD FOR PRODUCTION THEREOF

(75) Inventors: Tomoyuki Hirayama, Ibaraki (JP); Toshiyuki Iida, Ibaraki (JP); Yutaka Ohmori, Ibaraki (JP); Miyuki Kurogi, Ibaraki (JP); Hisae Shimizu, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 180 days.

(21) Appl. No.: 12/516,036

(22) PCT Filed: Nov. 6, 2008

(86) PCT No.: PCT/JP2008/070226
§ 371 (c)(1),
(2), (4) Date: May 22, 2009

(87) PCT Pub. No.: WO2009/069444
PCT Pub. Date: Jun. 4, 2009

(65) Prior Publication Data
US 2011/0064930 A1    Mar. 17, 2011

(30) Foreign Application Priority Data

Nov. 27, 2007   (JP) .................................. 2007-306089

(51) Int. Cl.
*C08G 63/02*   (2006.01)
*C08G 63/00*   (2006.01)

(52) U.S. Cl. ...................... 528/272; 264/176.1; 264/219; 428/64.1; 359/500; 528/176; 528/180; 528/182; 528/184; 528/190; 528/194; 528/198; 528/271

(58) Field of Classification Search ................ 264/176.1, 264/219; 428/64.1; 359/500; 528/176, 180, 528/182, 184, 190, 194, 196, 198, 271, 272
See application file for complete search history.

(56) References Cited

U.S. PATENT DOCUMENTS

| 5,344,916 A | 9/1994 | Harris et al. |
| 5,480,964 A | 1/1996 | Harris et al. |
| 5,580,950 A | 12/1996 | Harris et al. |
| 6,853,424 B2 | 2/2005 | Elman et al. |
| 7,250,200 B2 | 7/2007 | Elman et al. |
| 2002/0091200 A1* | 7/2002 | Angiolini et al. ............. 525/199 |
| 2004/0021815 A1 | 2/2004 | Elman et al. |
| 2004/0027521 A1 | 2/2004 | Elman et al. |
| 2004/0223103 A1 | 11/2004 | Elman et al. |

FOREIGN PATENT DOCUMENTS

| EP | 1387210 A1 | 2/2004 |
| JP | 6-298927 A | 10/1994 |
| JP | 8-188644 A | 7/1996 |
| JP | 10-90739 A | 4/1998 |
| JP | 2002145998 | * 5/2002 |
| JP | 2004-70329 A | 3/2004 |
| JP | 2004-203032 A | 7/2004 |
| WO | 94/24191 A1 | 10/1994 |

OTHER PUBLICATIONS

International Search Report of PCT/JP2008/070226, date of mailing Feb. 10, 2009.
Notification of Transmittal of Translation of the International Preliminary Report on Patentability (Form PCT/IB/338) of International Application No. PCT/JP2008/070226 mailed Jun. 17, 2010 with Forms PCT/IB/373 and PCT/ISA/237.
Korean Office Action dated Mar. 14, 2011, issued in corresponding Korean Patent Application No. 2009-7008063. X.

* cited by examiner

*Primary Examiner* — Terressa M Boykin
(74) *Attorney, Agent, or Firm* — Westerman, Hattori, Daniels & Adrian, LLP

(57) ABSTRACT

The invention relates to an optical film containing aromatic polymer which shows high solubility to solvents, and methods for production thereof. Further, the invention also relates to an optical laminate, a polarizing plate, and an image display device each using the optical film. The optical film may be attained by using polyester with a specific structure. The polyester with a specific structure may be obtained by condensation polymerization of bisphenol compound(s) and dicarboxylic acid compound(s) with biphenyl structure, and preferably has no halogen atom in its chemical structure. The optical film of the invention advantageously has not only high solubility in solvents but also a high level of heat resistance and birefringence producing capability. When the content of the biphenyl structure is high, the optical film of the invention can also have large wavelength dispersion of birefringence.

13 Claims, 1 Drawing Sheet

[Fig. 1]
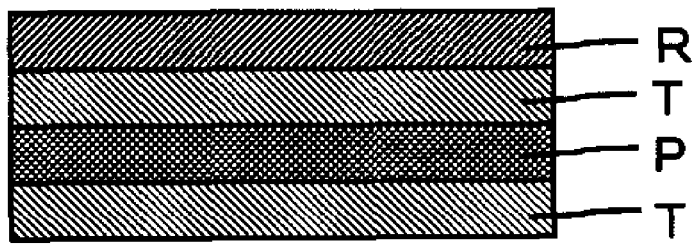
[Fig. 2]
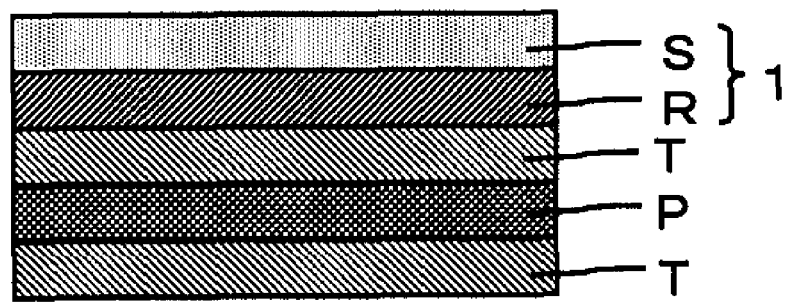
[Fig. 3]
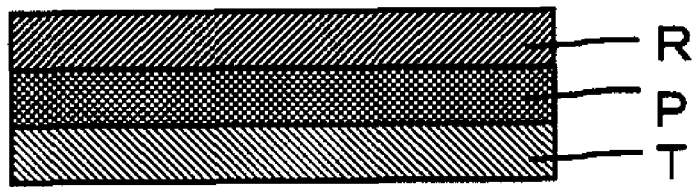
[Fig. 4]
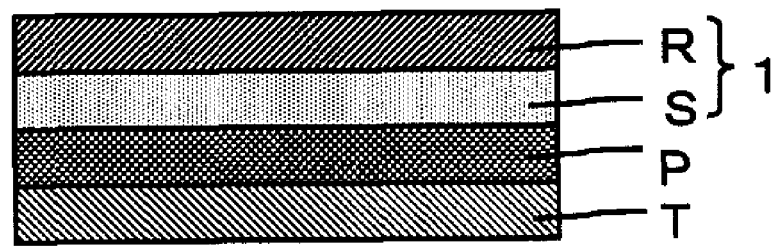

OPTICAL FILM AND METHOD FOR PRODUCTION THEREOF

TECHNICAL FIELD

The invention relates to an optical film used for optical compensation or the like of liquid crystal displays, an optical laminate including the optical film, and methods for production thereof. The invention also relates to a polarizing plate using the optical film and/or the optical laminate and to an image display device such as a liquid crystal display, an organic electroluminescence (EL) display, or a plasma display panel (PDP), using the optical film and/or the optical laminate.

BACKGROUND ART

In conventional technologies, birefringent polymer materials have been used for optical compensation or the like of liquid crystal displays. Such optical compensation materials that are widely used include plastic films that have undergone stretching or the like so that they have birefringence. In recent years, an optical compensation material including a substrate coated with a polymer having high birefringence-producing capability, such as aromatic polyimide or aromatic polyester, has also been developed (see for example Patent Documents 1 and 2).

Such an aromatic polymer is characterized by having a high level of heat resistance and mechanical strength but tends to have low solubility in organic solvents. Therefore, an optical film mainly composed of such an aromatic polymer is generally formed by a process including the steps of dissolving the polymer in a high-polarity solvent, which therefore has high solubility, to form a solution, and then applying the solution to a metallic drum or metallic belt or a base film or the like and drying it to form a film. In such a film production method, however, since a choice of solvents capable of dissolving the polymer is limited, drying conditions may be restricted, or expensive equipment may be needed. Since the substrate used in the coating process has to be insoluble in the solvent, materials usable for the substrate are also limited. From these points of view, it has been demanded to develop a polymer that is soluble in a low-polarity solvent such as toluene or ethyl acetate and has birefringence-producing capability so that it can function as an optical compensation material.

Patent Document 1: the pamphlet of PCT International Publication No. WO94/24191

Patent Document 2: Japanese Patent Application Laid-Open (JP-A) No. 2004-070329

DISCLOSURE OF INVENTION

Problems to be Solved by the Invention

An object of the invention is to provide an optical film including a highly-soluble aromatic polymer and to provide a method for production thereof. Another object of the invention is to provide an optical laminate, a polarizing plate, and an image display device each using the optical film.

Means for Solving the Problems

As a result of investigations, the inventors have found that the problems described above can be solved using an optical film containing a polyester with a specific structure, and have completed the invention. Specifically, the invention is directed to an optical film including an ester-based polymer having a repeating unit represented by formula (I):

[Formula 1]

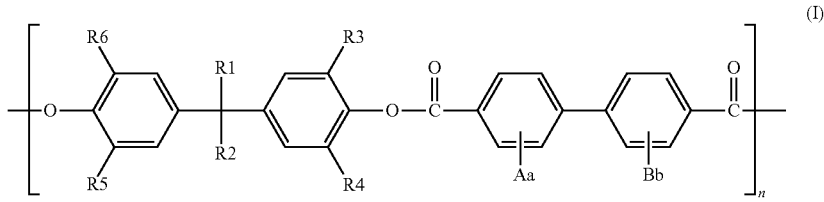

In the formula (I) above, A and B each represent a substituent, a and b represent the number of the substituents A and the number of the substituents B, respectively, each of which is an integer of 0 to 4, A and B each independently represent hydrogen, halogen, an alkyl group of 1 to 6 carbon atoms, or a substituted or unsubstituted aryl group, R1 and R2 each independently represent a straight-chain or branched alkyl group of 1 to 10 carbon atoms or a substituted or unsubstituted aryl group, R3 to R6 each independently represent a hydrogen atom, a halogen atom, a straight-chain or branched alkyl group of 1 to 6 carbon atoms, a cycloalkyl group of 5 to 10 carbon atoms, or a substituted or unsubstituted aryl group (provided that at least one of R3 to R6 is not a hydrogen atom), and n represents an integer of 2 or more.

Furthermore, in the formula (I) with respect to the optical film of the invention, R1 preferably represents a methyl group, and R2 preferably represents a straight-chain or branched alkyl group of 2 to 4 carbon atoms.

Furthermore, in the formula (I) with respect to the optical film of the invention, R3 and R5 each preferably represent a straight-chain or branched alkyl group of 1 to 4 carbon atoms, and R4 and R6 each preferably represent a hydrogen atom or a straight-chain or branched alkyl group of 1 to 4 carbon atoms.

Furthermore, in a preferable embodiment of the optical film of the invention, the ester-based polymer is a non-halogenated ester-based polymer having no halogen atom in its chemical structure.

Furthermore, in a preferable embodiment of the optical film of the invention, the ester-based polymer is soluble in toluene and/or ethyl acetate.

Furthermore, in a preferable embodiment of the optical film of the invention, it has a transmittance of 90% or more at a wavelength of 400 nm.

Furthermore, in a preferable embodiment of the optical film of the invention, it has a thickness of 20 μm or less.

Furthermore, in a preferable embodiment of the optical film of the invention, its refractive index (nz) in the film thickness direction is smaller than the maximum (nx) of its in-plane refractive index.

Furthermore, in a preferable embodiment of the optical film of the invention, it has a Rth(450)/Rth(550) ratio of 1.09 or more, wherein Rth(450) is the retardation of the optical film in its thickness direction at a wavelength of 450 nm, and Rth(550) is the retardation of the optical film in its thickness direction at a wavelength of 550 nm.

The invention is also directed to an optical laminate including a polymer substrate and the optical film placed on and bonded to the polymer substrate.

The invention is also directed to a polarizing plate including a polarizer and the optical film or the optical laminate.

The invention is also directed to an image display including at least one of the optical film, the optical laminate, and the polarizing plate.

The invention is also directed to a method for producing the optical film, comprising the steps of:

preparing a solution comprising the ester-based polymer represented by the formula (I) and a solvent; and applying the solution to a surface of a polymer substrate and drying the solution so that a film placed on and bonded to the polymer substrate is formed.

Further, the invention is also directed to a method for producing the optical laminate, comprising the steps of:

preparing a solution comprising the ester-based polymer represented by the formula (I) and a solvent;

applying the solution to a surface of a polymer substrate and drying the solution so that a film placed on and bonded to the polymer substrate is formed; and transferring the optical film to another substrate of a polymer.

BRIEF DESCRIPTION OF DRAWINGS

FIG. 1 is a sectional view schematically illustrating an example of the structure of the polarizing plate of the invention.

FIG. 2 is a sectional view schematically illustrating an example of the structure of the polarizing plate of the invention.

FIG. 3 is a sectional view schematically illustrating an example of the structure of the polarizing plate of the invention.

FIG. 4 is a sectional view schematically illustrating an example of the structure of the polarizing plate of the invention.

DESCRIPTION OF REFERENCE SYMBOLS

In the drawings, reference symbol P represents a polarizer, R an optical film, T a transparent protective film, S a substrate, and 1 an optical laminate.

BEST MODE FOR CARRYING OUT THE INVENTION

The optical film of the invention includes an ester-based polymer having the repeating unit represented by formula (I) below.

[Formula 2]

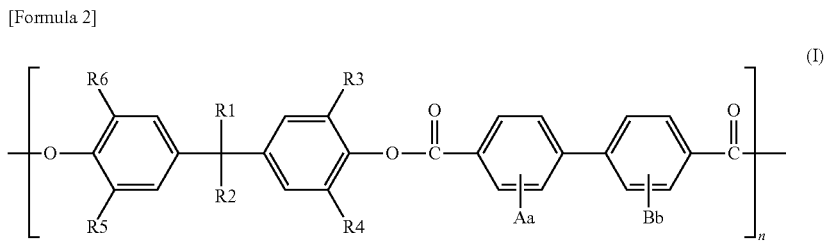

In formula (I), A and B each represent a substituent, a and b represent the number of the substituents A and the number of the substituents B, respectively, each of which is an integer of 0 to 4. A and B each independently represents hydrogen, halogen, an alkyl group of 1 to 6 carbon atoms, or a substituted or unsubstituted aryl group. R1 and R2 each independently represent a straight-chain or branched alkyl group of 1 to 10 carbon atoms or a substituted or unsubstituted aryl group. R3 to R6 each independently represent a hydrogen atom, a halogen atom, a straight-chain or branched alkyl group of 1 to 6 carbon atoms, a cycloalkyl group of 5 to 10 carbon atoms, or a substituted or unsubstituted aryl group (provided that at least one of R3 to R6 is not a hydrogen atom). n represents an integer of 2 or more.

When any one of A, B and R1 to R6 is an unsubstituted aryl group, the unsubstituted aryl group may be a phenyl group, a biphenyl group, a terphenyl group, a naphthyl group, a binaphthyl group, a triphenylphenyl group, or the like. When any one of A, B, R1, and R2 is a substituted aryl group, the substituted aryl group may be derived from the unsubstituted aryl group by replacing one or more hydrogen atoms by a straight-chain or branched alkyl group of 1 to 10 carbon atoms, a straight-chain or branched alkoxy group of 1 to 10 carbon atoms, a nitro group, an amino group, a silyl group, halogen, a halogenated alkyl group, a phenyl group, or the like. Further, the halogen (Z) may be fluorine, chlorine, bromine, iodine, or the like. Further, examples of the halogen atom for R1 to R6 and the halogen for Z include fluorine, chlorine, bromine, iodine, and the like. Further, the cycloalkyl group of 5 to 10 carbon atoms for R3 to R6 may have one or more straight-chain or branched alkyl groups of 1 to 5 carbon atoms on the ring. Specific examples of the cycloalkyl group include a cyclopentyl group, a cyclohexyl group, a cycloheptyl group, a cyclooctyl group, a cyclononyl group, a cyclodecyl group, and a cycloalkyl group of 5 to 10 carbon atoms having a substituent such as a methyl group, an n-propyl group, an isopropyl group, an n-butyl group, an isobutyl group, or a tert-butyl group on the ring of any of the above. Among these, a cyclohexyl group is preferred.

In the formula (I), R1 and R2 are preferably each independently a straight-chain or branched alkyl group of 1 to 4 carbon atoms. Among these, R1 is preferably a methyl group, and R2 is preferably a straight-chain or branched alkyl group of 2 to 4 carbon atoms, and R2 is particularly preferably an ethyl group or an isobutyl group. If R1 and/or R2 are/is an alkyl group of too many carbon atoms, birefringence may be less likely to be produced or heat resistance (glass transition temperature) may be reduced in some cases. Further, if the number of the carbon atoms in each of R1 and R2 is too small, poor solubility in solvents may be provided in some cases.

Further in the formula (I), R3 to R6 are preferably each independently a hydrogen atom or a straight-chain or branched alkyl group of 1 to 4 carbon atoms (provided that at least one of R3 to R6 is not a hydrogen atom). Among these, R3 and R5 are preferably a straight-chain or branched alkyl group of 1 to 4 carbon atoms, and R4 and R6 each represent a hydrogen atom or a straight-chain or branched alkyl group of 1 to 4 carbon atoms. In particular, all of R3 to R6 are preferably a straight-chain or branched alkyl group of 1 to 4 carbon atoms, and more preferably, all of R3 to R6 are methyl groups. When R3 to R6 are substituents, an ester-based polymer with high solubility in solvents is provided. Although the reason why the solubility varies with the number of carbon atoms in the substituent is not clear, this may be because methylene chloride and chloroform and high boiling point polar solvents such as dimethylformamide (DMF) and dimethylacetamide (DMAc). If a halogenated solvent, DMF, DMAc, or the like having high solubility is used to dissolve ester-based polymers, it may also dissolve substrates used in the process of forming optical films by coating. Therefore, if a solvent having high solubility is used, substrates used in the process of forming optical films by coating are limited to those having high solvent resistance.

In contrast, if ester-based polymers used are soluble in toluene or ethyl acetate, the use of toluene or ethyl acetate as a solvent will advantageously broaden the range of available substrate selection. In addition to the broadened range of substrates, toluene or ethyl acetate is also preferred, because its environmental loading is small as compared with that of halogenated solvents. Toluene or ethyl acetate as a solvent is also preferred, because the energy required to evaporate the solvent is smaller than that required to evaporate high boiling point solvent. In an embodiment of the invention, when any of the R1 to R6 groups has a substituent, the resulting ester-based polymer is also soluble in a low boiling point solvent such as toluene or ethyl acetate.

As long as the ester-based polymer has the structure of formula (I), it may be a copolymer having any other structure. In particular, a copolymer having a structure represented by formula (II) or (III) shown below is preferably used.

[Formula 3]

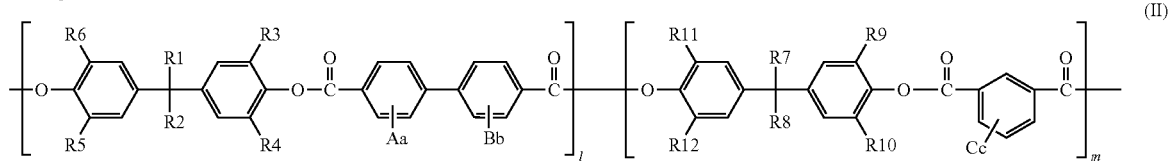

[Formula 4]

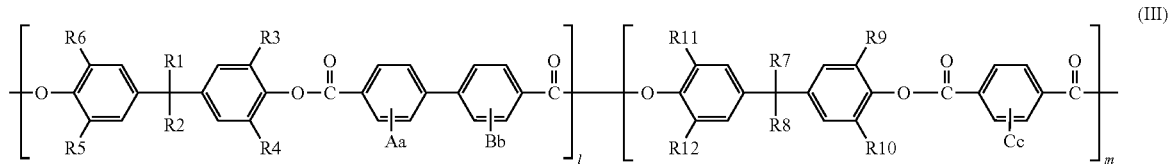

stacking between the aromatic rings can be overcome by the steric hindrance caused by the substituent or substituents on the phenyl group.

In the invention, the ester-based polymer is preferably a non-halogenated ester-based polymer having no halogen atom in its chemical structure, in view of environmental loading reduction. In conventional technologies, halogen atoms are often used in polymer structures, in order to impart solubility in solvents or the like to aromatic polymers. However, the polymers containing a halogen atom may have the problem of environmental loading such as a tendency to produce dioxins upon low-temperature combustion. In contrast, the ester-based polymer with a specific combination of R1 and R2 for use in the optical film of the invention is highly soluble in solvents even when it contains no halogen atom in its chemical structure.

In an embodiment of the invention, the ester-based polymer is preferably soluble in toluene or ethyl acetate. In general, the solubility of polyesters in solvents is relatively low. Therefore, polyesters tend to be less soluble in solvents other than environmentally-loading halogenated solvents such as Note that in general formulae (II) and (III), Aa, Bb, and R1 to R6 each have the same meaning as defined in general formula (I); R7 to R12 have the same meaning as defined for R1 to R6, respectively; C and c has the same meaning as defined for A and a or B and b, respectively; and l and m are each an integer of 2 or more. The polymer having the structure represented by general formula (II) or (III) may have any sequence with no particular limitation and may be any of a block copolymer and a random copolymer, although block copolymers are suggested by general formulae (II) and (III) for convenience of illustration.

In formulae (II) and (III), the content of the biphenyl structure component, namely the value of l/(l+m), is preferably 0.2 or more, more preferably 0.3 or more, even more preferably 0.5 or more. If the value of l/(l+m) is too small, the resulting film may tend to have small wavelength dispersion or to produce low birefringence, although the resin has good solubility in solvents. While the value of 1/(l+m) has no upper limit, 1/(l+m) is preferably 0.9 or less, more preferably 0.8 or less, in order to ensure the solubility in a low boiling point solvent such as toluene or ethyl acetate or the transparency of the optical film. Concerning formulae (II) and (III), the polymer preferably has a 1,3-phenylene structure as shown by formula (II) in order to have high solubility, while the polymer preferably has a 1,4-phenylene structure as shown by formula (III) in order to produce high birefringence. A copolymer having both 1,3-phenylene and 1,4-phenylene structures may also be used.

The ester-based polymer for use in the optical film of the invention may contain any other repeating unit, as long as it contains any of the structures represented by general formulae (I) to (III), respectively. The content of the structure or structures represented by any of general formulae (I) to (III) is preferably, but not limited to, 50% by mole or more, more preferably 70% by mole or more, even more preferably 80% by mole or more, as long as the desired solubility of the polymer according to the invention and the birefringence-producing capability can be maintained.

The ester-based polymer preferably has a weight-average molecular weight (Mw) of 3,000 or more, more preferably from 5,000 to 1,000,000, even more preferably from 10,000 to 500,000, most preferably from 50,000 to 350,000. When the molecular weight is too low, the film strength can be insufficient, or optical properties can significantly change upon exposure to a high-temperature environment. When the molecular weight is too high, the productivity of the optical film can be reduced due to a reduction in the solubility in solvents, or the like. In addition, the Mw may be determined by the measurement method described later in the section of EXAMPLES.

The glass transition temperature of the polymer is preferably, but not limited to, 100° C. or more, more preferably 120° C. or more, even more preferably 150° C. or more, in view of the heat resistance of the optical film. In view of formability, workability such as stretchability, the glass transition temperature is also preferably 300° C. or less, more preferably 250° C. or less.

The ester-based polymer for use in the optical film of the invention may be produced by known methods with no particular limitation. In general, it may be obtained by condensation polymerization of a dicarboxylic acid compound(s) or a derivative(s) thereof and a corresponding bisphenol compound(s).

A variety of condensation polymerization methods are generally known, such as melt condensation polymerization methods by removal of acetic acid, melt condensation polymerization methods by removal of phenol, dehydrochlorination homogeneous polymerization methods that are performed in an organic solvent system capable of dissolving the polymer and use the dicarboxylic acid compound in the form of an acid dichloride and an organic base, interfacial condensation polymerization methods in which dicarboxylic acid dichloride and bisphenol are polymerized in a two-phase system of an aqueous alkali solution and a water-immiscible organic solvent, and direct condensation polymerization methods in which a bisphenol compound and a dicarboxylic acid are directly used with a condensing agent to form an active intermediate in the reaction system. In particular, the ester-based polymer is preferably produced by interfacial condensation polymerization, in view of transparency, heat resistance, and high-molecular-weight production.

When the ester-based polymer is produced by interfacial condensation polymerization, monomers (bisphenol and dicarboxylic acid chloride), an organic solvent, an alkali, a catalyst, and so on may be used.

When the polyester having the structure of formula (I) is produced, the dicarboxylic acid chloride may be 4,4'-biphenyldicarboxylic acid chloride or a 4,4'-biphenyldicarboxylic acid chloride derivative in which the aromatic ring of the 4,4'-biphenyldicarboxylic acid chloride moiety has a substituent(s), examples of which are the same as those given above for A or B in formula (I). When the copolyester of formula (II) or (III) is produced, terephthaloyl chloride, isophthaloyl chloride or a derivative thereof having a substituent(s), examples of which are the same as those given above for A or B in formula (I), may be used in addition to the above.

Examples of the bisphenol include such as 2,2-bis(3-methyl-4-hydroxyphenyl)propane, 2,2-bis(3,5-dimethyl-4-hydroxyphenyl)propane, 2,2-bis(3-methyl-4-hydroxyphenyl)butane, 2,2-bis(3-methyl-4-hydroxyphenyl)-4-methylpentane, 2,2-bis(3-sec-butyl-4-hydroxyphenyl)propane, and 2,2-bis(3-cyclohexyl-4-hydroxyphenyl)propane. Furthermore, bisphenols even other than the above diols may also be produced as monomers for the polyester by known methods of allowing phenol derivatives to react with corresponding ketones in the presence of an acid catalyst.

The organic solvent used for the polymerization reaction is preferably, but not limited to, one that is less miscible with water and capable of dissolving the ester-based polymer, such as a halide solvent such as dichloromethane, chloroform, or 1,2-dichloroethane, or anisole. Two or more of these solvents may be used in the form of a mixture.

The alkali to be used may be sodium hydroxide, potassium hydroxide, lithium hydroxide, or the like. The amount of the alkali used is generally from 2 to 5 times by mole (1 to 2.5 molar equivalents) the amount of the bisphenol monomer.

The catalyst that may be used is preferably a phase transfer catalyst such as a quaternary ammonium salt such as tetrabutylammonium bromide, trioctylmethylammonium chloride, or benzyltriethylammonium chloride; a quaternary phosphonium salt such as tetraphenylphosphonium chloride or triphenylmethylphosphonium chloride; or a polyethylene oxide compound such as polyethylene glycol, polyethylene glycol monomethyl ether, polyethylene glycol dimethyl ether, dibenzo-18-crown-6, or dicyclohexyl-18-crown-6. In particular, tetraalkylammonium halides are preferably used in view of handleability such as removability of the catalyst after the reaction. If necessary, any other additive such as an antioxidant or a molecular weight modifier may also be used.

Methods for controlling the molecular weight of the ester-based polymer include a method of changing the functional group ratio between the hydroxyl group and the carboxyl group for polymerization and a method of adding a monofunctional substance as a molecular weight modifier in the polymerization process. Examples of such a monofunctional substance used as a molecular weight modifier include monofunctional phenols such as phenol, cresol, and p-tert-butylphenol; monofunctional chlorides such as benzoic acid chloride, methanesulfonyl chloride, and phenyl chloroformate; and monofunctional alcohols such as methanol, ethanol, n-propanol, isopropanol, n-butanol, pentanol, hexanol, dodecyl alcohol, stearyl alcohol, benzyl alcohol, and phenethyl alcohol. After the polymerization reaction, a monofunctional acid chloride may be allowed to react so that the terminal phenol can be sealed. The terminal sealing is preferably used, because it can prevent oxidative coloration of the phenol. An antioxidant may also be concomitantly used in the polymerization process.

When an interfacial condensation polymerization reaction is used, the polymerization reaction yields a mixture of an aqueous phase and an organic phase, which contains not only a polymer, an organic solvent and water but also a catalyst and impurities such as remaining monomers. When interfacial condensation polymerization is performed with a halide solvent, water-soluble impurities are generally removed by a method of washing with water that includes repeating a separation process including separation and removal of the aqueous phase. After washing with water, if necessary, reprecipitation may be performed using a water-miscible organic solvent serving as a poor solvent for the polymer, such as acetone or methanol. The reprecipitation with the water-miscible organic solvent allows dehydration and desolvation so that a powder can be produced and that hydrophobic impurities such as bisphenol compounds can be reduced in many cases.

A solvent that is less compatible with water and cannot dissolve 0.5% by weight or more of the ester-based polymer is preferably used as a water-immiscible organic solvent serving as a poor solvent for the polymer. The boiling point of the solvent is preferably 120° C. or less so that the solvent can be easily removed by heat drying. Preferred examples of such a solvent include hydrocarbons such as cyclohexane and isophorone; and alcohols such as methanol, ethanol, propanol, and isopropyl alcohol, but preferred examples are variable, because the solubility depends on the polymer type.

The concentration of the monomers added for the interfacial condensation polymerization and the concentration of the polymer for post treatment are preferably set high so that high productivity can be provided. The interfacial condensation polymerization preferably has a concentration such that the amount of the polymer can be 1% by weight or more, preferably 3% by weight or more, more preferably 5% by weight or more, based on the total amount of the liquid including the aqueous phase and the organic phase obtained after the reaction.

The reaction temperature is preferably, but not limited to, from −5° C. to 50° C., more preferably from 5° C. to 35° C., particularly preferably from 10° C. to 30° C. or near room temperature. When the reaction temperature falls within the range, the viscosity and the temperature can be easily controlled during the reaction, and adverse reactions such as hydrolysis and oxidative coloration can be reduced.

In order to prevent side reactions, the reaction temperature may be previously set low in consideration of generation of heat associated with the polymerization reaction. In order to allow the reaction to proceed gradually, an alkali solution or dicarboxylic acid dichloride may be gradually added, or the solution may be added dropwise. The addition of the alkali solution or dicarboxylic acid dichloride in such a manner may be performed in a short time period such as 10 minutes or less, but is preferably performed over 10 to 120 minutes, more preferably 15 to 90 minutes, in order to suppress the generation of heat. In order to prevent oxidative coloration, the reaction is preferably allowed to proceed under an inert gas atmosphere such as nitrogen.

After the addition of the alkali solution and dicarboxylic acid dichloride, the reaction time is generally from 10 minutes to 10 hours, preferably 30 minutes to 5 hours, more preferably 1 to 4 hours, while it varies with the type of the monomers, the amount of the alkali used, or the concentration of the alkali.

After the interfacial condensation polymerization reaction is completed, the resulting ester-based polymer may be subjected to separation and washing with water and then used in the form of a solution without modification or formed into a powder with a poor solvent. In addition, in view of reducing an environmental loading, the polyester according to the invention preferably has a halide solvent content of 1000 ppm or less, more preferably 300 ppm or less, even more preferably 100 ppm or less, particularly preferably 50 ppm or less. The ester-based polymer described above has particularly high solubility in solvents and is also soluble in non-halogen solvents. Therefore, non-halogen solvents (such as toluene, cyclohexanone, and anisole) may be used in the polymerization process so that the halogen content of the polymer product can be reduced.

When the ester-based polymer is produced by dehydrochlorination homogeneous polymerization, monomers (bisphenol and dicarboxylic acid chloride), an organic solvent, an amine compound and the like may be used.

The dicarboxylic acid chloride and the bisphenol to be used may each be the same as that described above for interfacial condensation polymerization. Further, the organic solvent is preferably a solvent capable of dissolving the ester-based polymer, and, therefore, a halide solvent such as dichloromethane, chloroform, and 1,2-dichloroethane, or anisole or the like is preferably used as described above. Furthermore, in the homogeneous polymerization method, the solvent may also be miscible with water, and therefore, besides the above solvents, a ketone solvent such as methyl ethyl ketone, or the like is preferably used.

The amine compound is used as an acid acceptor to promote the reaction. The amine compound to be used is preferably a tertiary amine such as trimethylamine, triethylamine, tri-n-butylamine, trihexylamine, tridodecylamine, N,N-dimethylcyclohexylamine, pyridine, a pyridine derivative such as 3-methylpyridine, quinoline, and dimethylaniline. Further, if necessary, any other additive such as an antioxidant or a molecular weight modifier may be used for the reaction system.

When a dehydrochlorination homogeneous polymerization method is used, the polymerization reaction yields a solution of the polymer in the solvent, which contains not only the polymer and the organic solvent but also impurities such as the amine compound and the remaining monomers. Such impurities may be removed by repeating separation and performing washing with water in the same manner as in the interfacial condensation polymerization process. Thereafter, if necessary, reprecipitation with a poor solvent may be performed so that the product can be recovered in the form of a powder.

Further, in the dehydrochlorination homogeneous polymerization method, the same conditions as those described for the interfacial condensation polymerization are preferably used with respect to the concentration of the monomers added, the polymer concentration during treatment, the reaction temperature, the reaction time, and the like.

The optical film of the invention may be produced with the ester-based polymer by known methods such as coating methods from a solution and melt extrusion methods to produce the film. In view of smoothness of the optical film, uniformity of the optical properties, or birefringence-producing capability, the optical film is preferably produced from a solution by coating methods.

When the film is produced from a solution by a coating method, the process may include the steps of preparing a solution containing the ester-based polymer and a solvent, applying the solution to the surface of a substrate, and drying the solution so that a film placed on and bonded to the substrate is formed.

Any appropriate solvent capable of dissolving the ester-based polymer may be selected for the solution depending on the type of the polymer. Examples of such a solvent include chloroform, dichloromethane, toluene, xylene, cyclohexanone, cyclopentanone, methyl isobutyl ketone, and ethyl acetate. One or more of these solvents may be used alone or in any combination. A poor solvent may also be added, as long as the ester-based polymer can be dissolved.

Specifically in order to reduce environmental loading, non-halogen solvents are preferably used, such as aromatic hydrocarbons, ketones, and esters. In particular, toluene, xylene, cyclohexanone, cyclopentanone, methyl isobutyl ketone, ethyl acetate, or mixed solvent containing any of these solvents is preferably used. Since the ester-based polymer has high solubility, such low-polarity solvents may be used for the film production.

Further, the solution may also contain an additional resin other than the ester-based polymer as long as the birefringence-producing capability or transparency is not significantly reduced. Examples of the additional resin include various types of general-purpose resins, engineering plastics, thermoplastic resins, and thermosetting resins.

As described above, when a resin or the like other than the ester-based polymer is added to the solution, the added amount thereof is preferably 0 to 20 parts by weight, and more preferably 0 to 15 parts by weight, based on 100 parts by weight of the ester-based polymer.

Various types of additives that meet the purpose of each preparation step (such as an antidegradant, an anti-ultraviolet agent, an optical anisotropy-adjusting agent, a releasing accelerator, a plasticizer, an infrared-absorbing agent, and a filler) may be added to the solution. They may be solid or oily and therefore a melting point or a boiling point thereof is not particularly limited. The additive is preferably added in an amount of more than 0 and 20 parts by weight or less, based on 100 parts by weight of the ester polymer.

For example, the concentration of the polymer in the solution is preferably, but not limited to, from 3 to 40 by weight, more preferably from 5 to 35 by weight, even more preferably from 10 to 30 by weight, in order to make the viscosity of the solution suitable for coating.

The optical film may be obtained by the steps of applying the solution to a substrate and appropriately drying the coating. The substrate to be used is typically, but not limited to, an endless substrate such as an endless belt or a drum-roller, or a finite-length substrate such as a polymer film. When the optical film of the invention is self-supporting, any of the endless substrate and the finite-length substrate may be used. The term "self-supporting" means that it is possible to handle the film even when the film is separated from the substrate, generally in a case where the film has a thickness of about 15 to about 500 µm, more preferably about 20 to about 300 µm. When the film has a thickness exceeding the range, too large thickness can cause problems with mass production, such as long time and high energy necessary for evaporation of the solvent and difficulty in obtaining uniform thickness.

When the optical film of the invention has a thickness of less than the above range, specifically about 1 to about 20 µm or 2 to 15 µm, the finite-length substrate is preferably used. Methods using an endless substrate such as an endless belt or a drum-roller require the steps of separating the optical film from the substrate and transporting the film, and therefore are generally not suitable for the production of non-self-supporting films. In such a case, such an infinite-length substrate as a glass plate or a polymer film should be used so that the optical film of the invention can be formed as a coating film on the substrate. The term "optical film" used in the description and claims encompasses not only a self-supporting film but also a non-self-supporting coating film.

As mentioned above, although, the optical film of the invention may be a self-supporting film or a coating film, it preferably has a thickness of not more than 20 µm. As explained later, the ester-based polymer used in the invention has high birefringence-producing capability, and therefore it may have high enough retardation that can be used for optical compensation or the like in liquid crystal display devices, even when the optical film is a coating film with thickness of not more than 20 µm.

Among the infinite-length substrates, the polymer substrate is preferably used in view of handleability. Examples of the polymer substrate include polymer films made of a transparent polymer such as a polyester-based polymer such as polyethylene terephthalate or polyethylene naphthalate, a cellulose-based polymer such as diacetylcellulose or triacetylcellulose, a polycarbonate polymer, an acrylic polymer such as poly(methyl methacrylate), a styrene-based polymer such as polystyrene or an acrylonitrile-styrene copolymer, an olefin-based polymer such as polyethylene, polypropylene, a cyclic or norbornene structure-containing polyolefin, or an ethylene-propylene copolymer, a vinyl chloride-based polymer, an amide-based polymer such as nylon or an aromatic polyamide, an imide-based polymer, a sulfone-based polymer, a polyethersulfone-based polymer, a polyetheretherketone-based polymer, a polyphenylene sulfide-based polymer, a vinyl alcohol-based polymer, a vinylidene chloride-based polymer, a vinyl butyral-based polymer, an acrylate-based polymer, a polyoxymethylene-based polymer, or an epoxy-based polymer, or any blend thereof.

The polymer substrate may be a polymer film alone or a laminate of a polymer film and a layer or layers formed thereon, such as an anchor coat layer or an antistatic layer. In addition, a film that has undergone corona treatment, plasma treatment, saponification, or the like so as to have improved adhesive properties, may also be used. An optically functional film such as the reflective polarizing plate disclosed in Japanese Patent Application National Publication (Laid-Open) No. 09-506837 may also be used as the substrate.

In an embodiment of the invention, since the ester-based polymer has high solubility such that a low-polarity solvent such as toluene can be used to form a solution, a film mainly composed of an acrylic or olefin polymer that generally has low solvent resistance may also be used as the substrate.

Examples of the coating method include spin coating, roll coating method, flow coating method, printing method, dip coating method, film casting method, bar coating method, and gravure printing method. If necessary, multilayer coating may also be used in the coating process.

The solution applied to the substrate is then dried to form an optical film on the substrate. Examples of the drying method include natural drying and drying by heating. The drying conditions may be appropriately determined depending on the type of the solvent, the type of the polymer, the concentration of the polymer, or the like. For example, the drying temperature is generally from 25° C. to 300° C., preferably from 50° C. to 200° C., particularly preferably from 60° C. to 180° C. Note that the drying may be performed at a constant temperature or performed while the temperature is gradually raised or lowered. The drying time is also not particularly limited. The solidifying time is generally from 10 seconds to 60 minutes, preferably from 30 seconds to 30 minutes. Further, when the optical film is self-supporting, it may be temporarily separated from the support and then dried.

As described above, the optical film of the invention may be any of a self-supporting film with a relatively large thickness and a non-self-supporting film with a relatively small thickness. Since the ester-based compound described above has high birefringence-producing capability, the optical film of the invention is preferably used in the form of a coating film. As described above, such a coating film may be formed on the substrate by applying the solution to the substrate and drying it, and consequently, an optical laminate including the substrate and the optical film placed on and bonded to the substrate may be obtained.

The optical laminate of the invention is described below. The substrate used to form the optical laminate preferably has high transparency, and therefore is preferably a glass substrate, a plastic film as described for the infinite-length substrate, or the like. The thickness of the substrate is preferably, but not limited to, from 10 to 500 µm, in view of handleability.

The substrate used as a support for the coating to form the optical film of the invention may be used as it is for the optical laminate. Alternatively, another substrate other than the support for the optical film coating may also be used.

The optical laminate of the invention may be produced using any of various methods with no particular limitation. In an embodiment, the method for producing the optical laminate of the invention includes the steps of preparing a solution containing the ester-based polymer and a solvent, applying the solution to the surface of a substrate, and drying the solution so that a film placed on and bonded to the substrate is formed. In another embodiment, the method may further include the step of transferring the optical film, which is placed on and bonded to the substrate, to another substrate, in addition to the steps described above.

The step of transferring the film to another substrate may include providing another substrate such as a glass plate or a polymer substrate, applying an adhesive or the like to the another substrate, bonding the optical film to the adhesive-coated surface of the another substrate, and separating the optical film from the support used for the coating so that the optical laminate is formed (this process is referred to "transfer"). In particular, an optical laminate including a substrate with low solvent resistance and the optical film of the invention placed on and bonded to the substrate is preferably formed using a method including the steps of applying the polymer solution to a support with high solvent resistance and drying it to form the optical film temporarily on the support and then performing the transfer method as described above to form the optical laminate.

The substrate used for the optical laminate preferably has high transparency and typically has a total light transmittance of 85% or more, preferably 90% or more, both when the substrate is the support used for the coating and when the substrate is another one to which the film is transferred.

The optical film of the invention obtained as described above preferably has high transparency. Specifically, it preferably has a transmittance of 90% or more, more preferably 92% or more, at a wavelength of 400 nm. Such high transparency can be achieved using the ester-based polymer described above.

In the optical film of the invention, nx is preferably larger than nz (nx>nz), wherein nx is the refractive index in a direction where the in-plane refractive index is maximum, namely the direction of the slow axis, and nz is the refractive index in the thickness direction. In addition, its birefringence ($\Delta nxz=nx-nz$) in the thickness direction at a wavelength of 550 nm is preferably 0.01 or more, more preferably from 0.012 to 0.07, even more preferably from 0.015 to 0.055. The optical film having such optical properties may be used for optical compensation or the like of liquid crystal displays.

The optical film of the invention can exhibit high birefringence-producing capability as described above, because it uses the ester-based polymer described above. As is evident from the Examples described below, therefore, even a coating film with a thickness of 20 µm or less can produce a thickness direction retardation (Rth) equal to, for example, a half or quarter of a wavelength. Herein, the thickness direction retardation (Rth) is expressed as $\Delta nxz \times d$, wherein d is the thickness of the optical film.

The optical film of the invention may have not only birefringence in the thickness direction but also an in-plane retardation ($\Delta nxy=nx-ny$) which can be varied by controlling the coating conditions or the stretching conditions, wherein ny is the refractive index in a direction where the in-plane refractive index is minimum, namely the direction of the fast axis.

In addition, the optical film of the invention preferably has large birefringence wavelength dispersion. While the birefringence or retardation value depends on the wavelength of measurement, the wavelength dispersion D of the optical film of the invention expressed by the formula $D=Rth(450)/Rth(550)$, wherein $Rth(\lambda)$ is the retardation in the thickness direction measured at a wavelength of $\lambda$ nm, is preferably 1.09 or more. As described above, the wavelength dispersion of the optical film of the invention can be increased by increasing the content of the biphenyl structure in the polyester polymer. The optical film with large wavelength dispersion can be used for optical compensation or the like in various types of liquid crystal display devices.

While the reason why the birefringence wavelength dispersion increases with increasing the content of the biphenyl structure in the polyester polymer is not clear, it can be considered that when the π conjugated system extends along the main chain of the polymer, the aromaticity can be high so that the absorption edge wavelength can be shifted to long wavelengths, which may lead to the increase in birefringence wavelength dispersion.

Next, the polarizing plate of the invention is described below. The polarizing plate of the invention is an optical compensation function-carrying polarizing plate having the optical film of the invention. Such a polarizing plate may have any structure, as long as it includes the optical film and a polarizer. As shown in FIG. 1, for example, the polarizing plate may be configured to include a polarizer (P), transparent protective films (T) placed on both sides of the polarizer (P), and the optical film of the invention (R) placed on the surface of one of the transparent protective films (T). Note that when the optical laminate (1) used includes a substrate (S) and the optical film (R) placed on and bonded to the substrate (S), any of the surfaces of the optical film (R) and the substrate (S) may face the transparent protective film, but the optical film of the invention (R) preferably faces the transparent protective film (T) as shown in FIG. 2.

Further, the transparent protective film may be placed on both or one side of the polarizer. When placed on both sides, for example, the transparent protective films used may be of the same type or different types.

Furthermore, in another mode, as shown in FIG. 3, the polarizing plate of the invention may include a polarizer (P), the optical film of the invention (R) placed on one surface of the polarizer (P), and the transparent protective film (T) placed on the other surface of the polarizer (P).

When the optical laminate (1) used includes a substrate (S) and the optical film (R) placed on and bonded to the substrate (R), any of the surfaces of the optical film (R) and the substrate (S) may face the polarizer (P), but the substrate (S) is preferably placed so as to face the polarizer (P). In such a structure, the substrate (S) can also serve as a transparent protective film for an optical compensation layer-carrying polarizing plate. Specifically, the transparent protective film (T) is not placed on both sides of the polarizer (P), but on one side of the polarizer (P), and the optical laminate of the invention (1) is placed on the other side such that the substrate (S) faces the polarizer (P), so that the substrate (S) of the optical laminate (1) can also serves as a transparent protective film. This structure provides a much thinner polarizing plate.

The polarizer to be used may be of various types with no particular limitation. For example, the polarizer may be a product produced by the steps of adsorbing a dichroic material such as iodine or a dichroic dye on a hydrophilic polymer film such as a polyvinyl alcohol-based film, a partially-formalized polyvinyl alcohol-based film, or a partially-saponified ethylene-vinyl acetate copolymer-based film and uniaxially stretching the film or may be a polyene-based oriented film such as a dehydration product of polyvinyl alcohol or a dehydrochlorination product of polyvinyl chloride. In particular, a polarizing layer including a polyvinyl alcohol-based film and a dichroic material such as iodine is preferred. The thickness of the polarizing layer is generally, but not limited to, about 5 to about 80 μm.

The thickness of the transparent protective film is generally from about 1 to about 500 μm, preferably from 1 to 300 μm, more preferably from 5 to 200 μm, particularly preferably from 5 to 150 μm, in view of strength, workability such as handleability, thin layer formability, or the like, while it may be determined as appropriate.

When transparent protective films are provided on both sides of a polarizer, protective films made of the same polymer material or different polymer materials may be used on the front and back sides.

The optical film, optical laminate, or polarizing plate of the invention is preferably used for image displays such as liquid crystal displays, organic electroluminescence (EL) displays, and plasma display panels, while it may be used for any application. For example, such image displays may be used for OA equipment such as personal computer monitors, notebook computers, and copy machines; portable device such as cellular phones, watches, digital cameras, personal digital assistances (PDAs), and portable game machines; home appliance such as video cameras, televisions, and microwave ovens; vehicle equipment such as back monitors, monitors for car navigation systems, and car audios; display equipment such as information monitors for stores; alarm systems such as surveillance monitors; and care and medical device such as care monitors and medical monitors.

In particular, the optical film of the invention is preferably used as an optical compensation film for liquid crystal display devices in order to compensate for birefringence caused by liquid crystal cells or improve the contrast or reduce the color shift for oblique viewing of image display devices, because it has high birefringence-producing capability. Further, since the optical film of the invention has large wavelength dispersion, it can be used as an optical compensation film for various types of liquid crystal cells, in contrast to optical films made of conventional ester-based polymers.

Examples

The invention is described below with reference to examples which are not intended to limit the scope of the invention. The examples and the comparative examples were evaluated by the methods described below.
(Glass Transition Temperature)

The glass transition temperature was determined with a differential scanning calorimeter (DSC-6200 (product name) manufactured by Seiko Instruments Inc.) by the method according to JIS K 7121 (1987) (the method for measuring the transition temperature of plastics). Specifically, 3 mg of a powdery sample was heated under a nitrogen atmosphere (gas flow rate: 50 ml/minute) from room temperature to 220° C. at a rate of temperature increase of 10° C./minute and then cooled to 30° C. at a rate of temperature decrease of 10° C./minute (first measurement). The sample was then heated again to 350° C. at a rate of temperature increase of 10° C./minute (second measurement). The data obtained through the second measurement was used, and the midpoint was defined as the glass transition temperature. Temperature correction of the calorimeter was performed using a reference material (indium).
(Molecular Weight)

The weight-average molecular weight (Mw) was determined as described below. A 0.1% THF solution of each sample was prepared and filtered through a 0.45 μm membrane filter. The filtrate was then measured using a GPC system HLC-8820GPC manufactured by Tosoh Corporation and an RI detector (incorporated in the GPC system). Specifically, the column temperature and the pump flow rate were set at 40° C. and 0.35 mL/minute, respectively, and the weight-average molecular weight was determined as a polystyrene-equivalent molecular weight by a data processing using an analytical curve previously prepared with standard polystyrenes with known molecular weights. The columns used were Super HZM-M (6.0 mm diameter×15 cm), Super HZM-M (6.0 mm diameter×15 cm), and Super HZ2000 (6.0 mm diameter×15 cm) in series, and THF was used as the mobile phase.
($\Delta nxz$ and Wave Dispersion)

KOBRA-WPR (trade name) manufactured by Oji Scientific Instruments and the program included in the system were used to calculate the birefringence $\Delta nxz(\lambda)$ in the thickness direction at the wavelength $\lambda$ nm from the in-plane retardation and the retardation at an angle of 40° which a sample is inclined at the measurement wavelength $\lambda$ ($\lambda$=450 nm and 550 nm). The retardation $Rth(\lambda)$ in the thickness direction at a wavelength of $\lambda$ nm was calculated from the resulting value according to the formula $Rth(\lambda)=\Delta nxz(\lambda) \times d$, and the wavelength dispersion ($Rth(450)/Rth(500)$) was calculated from the resulting values. The thickness of the film used was determined from the difference between the thickness of the polymer-coated glass and the thickness of the glass uncoated with the polymer using Dektak manufactured by Sloan Technology Corporation.
(Transmittance)

The transmittance was measured using a spectrophotometer U-4100 manufactured by Hitachi, Ltd. at a wavelength of 400 nm.
(Solubility Test)

The polymer was gradually added to a sample bottle containing each solvent, while the solubility was visually determined according to the criteria below.
⊙: soluble at 20% by weight or more;
◯: soluble at 10 to 20% by weight;
Δ: soluble but slightly cloudy;
×: insoluble.

Example 1

(Synthesis of Ester Polymer)

In a reaction vessel equipped with a stirrer, methylene chloride was added to 1.00 g of 2,2-bis(3-sec-butyl-4-hydroxyphenyl)propane and 0.65 g of triethylamine to form an 8 ml solution. An 8 ml solution prepared by adding methylene chloride to 0.41 g of 4,4'-biphenyldicarboxylic acid chloride and 0.30 g of isophthaloyl chloride was added to the solution at a temperature of 10° C. under stirring. After the addition was completed, the temperature was raised to room temperature (20° C.), and the mixture was stirred under a nitrogen atmosphere for 4 hours so that the reaction was allowed to proceed. After the polymerization, the solution was diluted with 20 ml of methylene chloride, washed with an aqueous diluted hydrochloric acid solution and ion-exchanged water, and then added to methanol so that the polymer was precipitated. The precipitated polymer was separated by filtration and dried under reduced pressure so that 1.15 g of a white polymer was obtained.

(Preparation of Optical Film)

The resulting polymer (0.1 g) was dissolved in cyclopentanone (0.5 g). The solution was applied to a glass plate by spin coating method, dried at 70° C. for 5 minutes, and then further dried at 110° C. for 30 minutes so that an optical film (with a thickness of 7.3 μm after the drying) was obtained.

Example 2

Synthesis of a polymer and preparation of an optical film were performed using the same process as in Example 1, except that the amounts of the reagents: 4,4'-biphenyldicarboxylic acid chloride and isophthaloyl chloride were changed to 0.61 g and 0.15 g, respectively.

Example 3

In a reaction vessel equipped with a stirrer, 0.90 g of 2,2-bis(3,5-dimethyl-4-hydroxyphenyl)-4-methylpentane and 0.03 g of benzyltriethylammonium chloride were dissolved in 15 ml of a 1 M sodium hydroxide solution. A solution of 0.39 g of 4,4'-biphenyldicarboxylic acid chloride and 0.28 g of isophthaloyl chloride in 15 ml of chloroform was added at a time to the solution under stirring, and the mixture was stirred at room temperature for 90 minutes. After the polymerization solution was allowed to stand and separate, the chloroform solution containing a polymer was separated, then washed with an acetic acid aqueous solution and ion-exchanged water, and then poured into methanol so that the polymer was precipitated. The polymer precipitated was separated by filtration and dried under reduced pressure to give 1.21 g of a white polymer (91% yield).

Example 4

Synthesis of a polymer and preparation of an optical film were performed using the process as in Example 3, except that the amounts of the reagents: 2,2-bis(3,5-dimethyl-4-hydroxyphenyl)-4-methylpentane, benzyltriethylammonium chloride and 4,4'-biphenyldicarboxylic acid chloride were changed to 1.00 g, 0.04 g and 0.43 g, respectively, and that 0.31 g of terephthaloyl chloride was used in place of 0.28 g of isophthaloyl chloride.

Example 5

Synthesis of a polymer and preparation of an optical film were performed using the same process as in Example 3, except that the amounts of the reagents: 2,2-bis(3,5-dimethyl-4-hydroxyphenyl)-4-methylpentane, benzyltriethylammonium chloride, 4,4'-biphenyldicarboxylic acid chloride and isophthaloyl chloride were changed to 1.00 g, 0.04 g and 0.64 g and 0.16 g, respectively.

Example 6

Synthesis of a polymer and preparation of an optical film were performed using the same process as in Example 5, except that 1.06 g of terephthaloyl chloride was used in place of 1.06 g of isophthaloyl chloride.

Example 7

Synthesis of a polymer and preparation of an optical film were performed using the process as in Example 1, except that 1.00 g of 2,2-bis(3-cyclohexyl-4-hydroxyphenyl)propane was used in place of 1.00 g of 2,2-bis(3-sec-butyl-4-hydroxyphenyl)propane and that the amounts of the reagents: triethylamine, 4,4'-biphenyldicarboxylic acid chloride and isophthaloyl chloride were changed to 0.57 g, 0.36 g and 0.26 g, respectively.

Example 8

Synthesis of a polymer and preparation of an optical film were performed using the process as in Example 1, except that 1.00 g of 2,2-bis(3-cyclohexyl-4-hydroxyphenyl)propane was used in place of 1.00 g of 2,2-bis(3-sec-butyl-4-hydroxyphenyl)propane and that the amounts of the reagents: triethylamine, 4,4'-biphenyldicarboxylic acid chloride and isophthaloyl chloride were changed to 0.57 g, 0.53 g and 0.13 g, respectively.

Example 9

Synthesis of a polymer and preparation of an optical film were performed using the process as in Example 3, except that 1.00 g of 2,2-bis(3-methyl-4-hydroxyphenyl)butane was used in place of 0.90 g of 2,2-bis(3,5-dimethyl-4-hydroxyphenyl)-4-methylpentane and that the amounts of the reagents: benzyltriethylammonium chloride, 4,4'-biphenyldicarboxylic acid chloride and isophthaloyl chloride were changed to 0.04 g, 0.48 g and 0.34 g, respectively.

Example 10

Synthesis of a polymer and preparation of an optical film were performed using the same process as in Example 9, except that the amounts of the reagents: 4,4'-biphenyldicarboxylic acid chloride and isophthaloyl chloride were changed to 0.70 g and 0.17 g, respectively.

Comparative Example 1

Synthesis of a polymer and preparation of an optical film were performed using the same process as in Example 3, except that 0.31 g of terephthaloyl chloride was used in place of 0.39 g of 4,4'-biphenyldicarboxylic acid chloride and that amounts of the reagents: benzyltriethylammonium chloride, 1 M sodium hydroxide solution and isophthaloyl chloride were changed to 0.06 g, 25 ml and 0.31 g, respectively.

Comparative Example 2

Synthesis of a polymer and preparation of an optical film were performed using the same process as in Comparative Example 1, except that the amounts of the reagents: terephthaloyl chloride and isophthaloyl chloride were changed to 0.47 g and 0.16 g, respectively.

The structures and properties of the polyester resins of Examples 1 to 10 and Comparative Examples 1 and 2 and the properties of the resulting optical films are shown in Table 1. The polymers of Examples 3 to 6 and 9 are each considered to have a glass transition temperature Tg higher than 250° C. (Tg>250° C.), because they showed no glass transition temperature up to 250° C. The polymer resin of Example 10 was decomposed before it showed a clear Tg.

TABLE 1

| | Polymer structure | | | | | | | Properties of Polymers | | | |
|---|---|---|---|---|---|---|---|---|---|---|---|
| | Substituents | | | | | | Molar | Solubility test | | | |
| | R1, R7 | R2, R8 | R3, R5 R9, R11 | R4, R6 R10, R12 | X | Y | ratio l/m | CPN | Toluene | MIBK | Ethyl acetate |
| Example 1 | Me | Me | s-Bu | H | Biph | IP | 50/50 | ⊙ | ⊙ | ⊙ | ⊙ |
| Example 2 | Me | Me | s-Bu | H | Biph | IP | 75/25 | ⊙ | ⊙ | ⊙ | ⊙ |
| Example 3 | Me | i-Bu | Me | Me | Biph | IP | 50/50 | ⊙ | ⊙ | ⊙ | ⊙ |
| Example 4 | Me | i-Bu | Me | Me | Biph | TP | 50/50 | ⊙ | ⊙ | ⊙ | ⊙ |
| Example 5 | Me | i-Bu | Me | Me | Biph | IP | 75/25 | ⊙ | ⊙ | Δ | X |
| Example 6 | Me | i-Bu | Me | Me | Biph | TP | 75/25 | ⊙ | ⊙ | Δ | X |
| Example 7 | Me | Me | c-Hex | H | Biph | IP | 50/50 | ⊙ | ⊙ | X | X |
| Example 8 | Me | Me | c-Hex | H | Biph | IP | 75/25 | ⊙ | ⊙ | X | X |
| Example 9 | Me | Et | Me | Me | Biph | IP | 50/50 | ⊙ | ⊙ | X | X |
| Example 10 | Me | Et | Me | Me | Biph | IP | 75/25 | Δ | Δ | X | X |
| Comparative Example 1 | Me | i-Bu | Me | Me | TP | IP | 50/50 | ⊙ | ⊙ | ⊙ | ⊙ |
| Comparative Example 2 | Me | i-Bu | Me | Me | TP | IP | 75/25 | ⊙ | ⊙ | ⊙ | ⊙ |

| | Properties of Polymers | | Properties of optical films | | |
|---|---|---|---|---|---|
| | Molecular | Heat | Birefringence | | |
| | weight Mw | resistance Tg(° C.) | Δnxz [550] | D | Transparency Transmittance (%) |
| Example 1 | 54000 | 103 | 0.017 | 1.10 | 92 |
| Example 2 | 52000 | 129 | 0.020 | 1.10 | 92 |
| Example 3 | 57000 | >250 | 0.016 | 1.10 | 92 |
| Example 4 | 46000 | >250 | 0.024 | 1.10 | 92 |
| Example 5 | 88000 | >250 | 0.029 | 1.10 | 92 |
| Example 6 | 84000 | >250 | 0.031 | 1.10 | 92 |
| Example 7 | 47000 | 157 | 0.016 | 1.10 | 92 |
| Example 8 | 25000 | 153 | 0.017 | 1.10 | 92 |
| Example 9 | 80000 | >250 | 0.026 | 1.10 | 92 |
| Example 10 | 68000 | — | 0.032 | 1.10 | 92 |
| Comparative Example 1 | 61000 | 205 | 0.014 | 1.06 | 92 |
| Comparative Example 2 | 47000 | 205 | 0.015 | 1.06 | 92 |

In the table 1, l/m represents the molar ratio between the respective repeating units in the ester-based copolymer, and R1 to R12, X, and Y each represent the substituent in formula (IV) below. In addition, i-Bu, s-Bu, c-Hex, Et, Me, and H represent isobutyl group, secondary butyl group, cyclohexyl group, ethyl group, methyl group, and a hydrogen atom, respectively, and Biph, IP and TP represent 4,4'-biphenylene, 1,3-phenylene and 1,4-phenylene, respectively. CPN and MIBK represent cyclopentanone and methyl isobutyl ketone (4-methyl-2-pentanone), respectively.

The optical films prepared in the examples all show high transparency and high wavelength dispersion. In the examples, for convenience of sample preparation, a glass plate was used as the substrate, and cyclopentanone was used as the solvent. Since the ester-based polymer for use in the optical film has high solubility, it can be formed into a film even when a polymer substrate and a toluene or ethyl acetate solvent are used, and the resulting optical film can have the same optical properties as those of the examples.

The optical film of Comparative Example 1 or 2 in which the ester-based polymer had no biphenyl structure had a small wavelength dispersion of less than 1.09, although it was highly soluble in solvents.

[Formula 5]

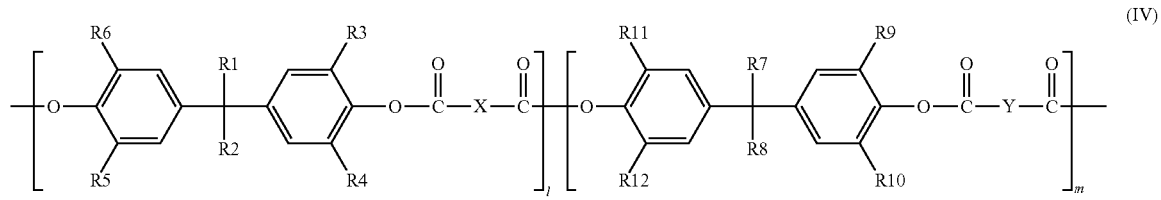

(IV)

The invention claimed is:

1. An optical film, comprising an ester-based polymer comprising a repeating unit represented by formula (I):

[Formula 1]

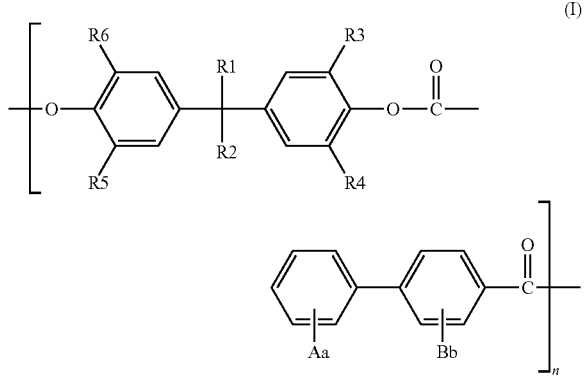

wherein
A and B each represent a substituent, a and b represent the number of the substituents A and the number of the substituents B, respectively, each of which is an integer of 0 to 4, A and B each independently represent hydrogen, halogen, an alkyl group of 1 to 6 carbon atoms, or a substituted or unsubstituted aryl group, R1 and R2 each independently represent a straight-chain or branched alkyl group of 1 to 10 carbon atoms or a substituted or unsubstituted aryl group, R3 to R6 each independently represent a hydrogen atom, a halogen atom, a straight-chain or branched alkyl group of 1 to 6 carbon atoms, a cycloalkyl group of 5 to 10 carbon atoms, or a substituted or unsubstituted aryl group (provided that at least one of R3 to R6 is not a hydrogen atom), n represents an integer of 2 or more; and wherein in formula (I), R1 is a methyl group, and R2 is a straight-chain or branched alkyl group of 2 to 4 carbon atoms.

2. The optical film of claim 1, wherein in formula (I), R3 and R5 each represent a straight-chain or branched alkyl group of 1 to 4 carbon atoms, and R4 and R6 each represent a hydrogen atom or a straight-chain or branched alkyl group of 1 to 4 carbon atoms.

3. The optical film of claim 1, wherein the ester-based polymer is a non-halogenated ester-based polymer having no halogen atom in its chemical structure.

4. The optical film of claim 1, wherein the ester-based polymer is soluble in toluene or ethyl acetate.

5. The optical film of claim 1, wherein it has a transmittance of 90% or more at a wavelength of 400 nm.

6. The optical film of claim 1, wherein it has a thickness of 20 μm or less.

7. The optical film of claim 1, wherein its refractive index (nz) in the film thickness direction is smaller than the maximum (nx) of its in-plane refractive index.

8. The optical film of claim 1, wherein it has a Rth(450)/Rth(550) ratio of 1.09 or more, wherein Rth(450) is the retardation of the optical film in its thickness direction at a wavelength of 450 nm, and Rth(550) is the retardation of the optical film in its thickness direction at a wavelength of 550 nm.

9. An optical laminate, comprising a polymer substrate and the optical film of claim 1 placed on and bonded to the polymer substrate.

10. A polarizing plate, comprising a polarizer and the optical film of claim 1.

11. An image display device, comprising the optical film of claim 1.

12. A method for producing the optical film of claim 1, comprising the steps of:
preparing a solution including the ester-based polymer represented by the formula (I) and a solvent; and
applying the solution to a surface of a polymer substrate and drying the solution so that a film placed on and bonded to the polymer substrate is formed.

13. A method for producing the optical laminate of claim 9, comprising the steps of:
preparing a solution including the ester-based polymer represented by the formula (I) and a solvent; and
applying the solution to a surface of a polymer substrate and drying the solution so that a film placed on and bonded to the polymer substrate is formed; and
transferring the optical film to another substrate of a polymer.

* * * * *

Disclaimer

7,999,059—Tomoyuki Hirayama, Ibaraki (JP); Toshiyuki Iida, Ibaraki (JP); Yutaka Ohmori, Ibaraki (JP); Miyuki Kurogi, Ibaraki (JP); Hisae Shimizu, Ibaraki (JP). OPTICAL FILM AND METHOD FOR PRODUCTION THEREOF. Patent dated August 16, 2011. Disclaimer filed April 1, 2011, by the assignee, Nitto Denko Corporation.

Hereby enters the term of this patent not to exceed beyond the expiration date of Ser. No.12/439,795 filed August 22, 2008.

*(Official Gazette September 20, 2011)*